United States Patent [19]

Higuchi et al.

[11] Patent Number: 4,644,870
[45] Date of Patent: Feb. 24, 1987

[54] CONVEYING SYSTEM UTILIZING A LINEAR PULSE MOTOR

[75] Inventors: Toshiro Higuchi, Yokohama; Shigeki Kamei, Nishinomiya; Kojiro Kawaguchi, Osaka, all of Japan

[73] Assignee: Hitachi Kiden Kogyo Kabushiki Kaisha, Amagasaki, Japan

[21] Appl. No.: 663,724

[22] Filed: Oct. 22, 1984

[30] Foreign Application Priority Data

Oct. 22, 1983 [JP] Japan .................. 58-197954

[51] Int. Cl.⁴ .................. B60L 13/02; B60L 7/28
[52] U.S. Cl. .................. 104/292; 104/307
[58] Field of Search .............. 104/290, 292, 1 R, 165, 104/166, 172 R, 172 B, 173 R; 198/619, 472

[56] References Cited

U.S. PATENT DOCUMENTS

| 3,343,499 | 9/1967 | Burrows | 104/172 B |
| 3,702,099 | 11/1972 | Ricaud et al. | 104/292 X |
| 3,853,068 | 12/1974 | Avery | 104/292 |
| 4,331,229 | 5/1982 | Kamm | 198/472 X |
| 4,473,011 | 9/1984 | Wuscheck | 104/173 R |
| 4,492,301 | 1/1985 | Inaba et al. | 198/472 |

FOREIGN PATENT DOCUMENTS 846349 7/1981 U.S.S.R. .................. 104/292

Primary Examiner—Robert B. Reeves
Assistant Examiner—David F. Hubbuch
Attorney, Agent, or Firm—Armstrong, Nikaido, Marmelstein & Kubovcik

[57] ABSTRACT

The present invention provides a conveying system for use for carrying the work, equipped with a conveying truck having a mover of a linear pulse motor fixed at its side bottom and main travelling rails having stators mounted thereon, there being provided openings for use in operation with specified areas about the central part of the aforementioned conveying truck, thereby permitting the operation to be performed from below on the work loaded on the conveying truck, and with the stators of the aforementioned linear pulse motor located at stations for the conveying truck, the aforementioned mover and the stators composing the linear pulse motor.

4 Claims, 4 Drawing Figures

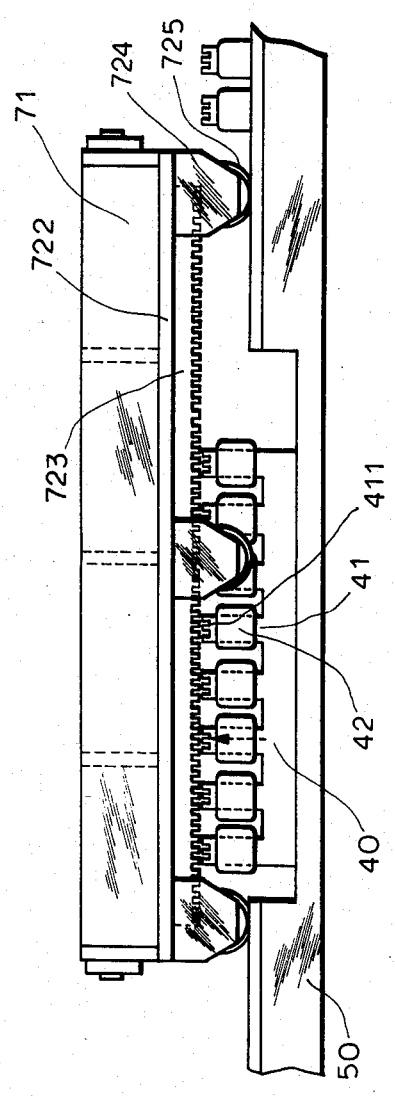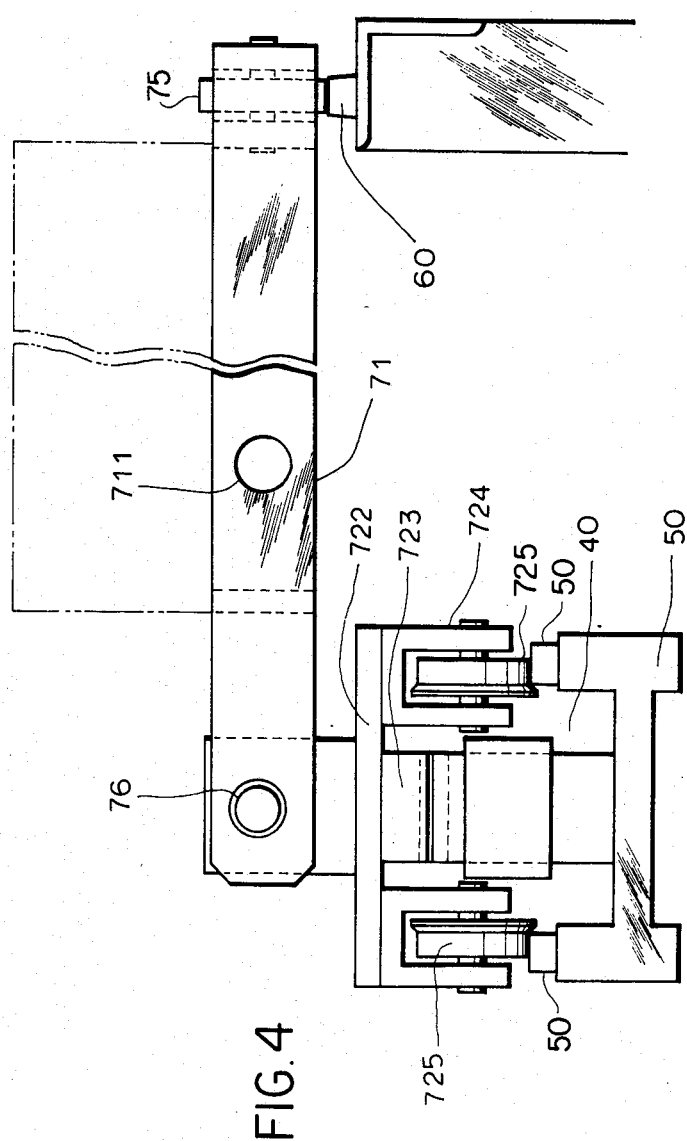

CONVEYING SYSTEM UTILIZING A LINEAR PULSE MOTOR

BACKGROUND OF THE INVENTION

1. Field of the Invention

The present invention relates to a conveying system and particularly, pertains to a conveying system utilizing a linear pulse motor.

2. Description of the Prior Art

Of late, to meet the demand for improvement in stopping accuracy at stations in conveying works, which has arisen in accompaniment with automation in working and assembling in mechanical industries, conveying systems utilizing linear pulse motors are in use, taking the place of such conveying means as belt conveyors, etc.

FIG. 1 is a diagram for explanation of the main part of a conveying system utilizing a linear pulse motor which has heretofore been in use.

Referring to this diagram, 3 denotes a base; 31, tracks provided at both ends of the aforementioned base; 2, a conveying truck; and 24, wheels placed on both sides of the aforementioned conveying truck.

Thus 1 designates stators fixed at the top of the aforementioned base 3; an iron core 11 composes the aforementioned stator, together with a coil 13; and 21 designates a mover formed integral with the conveying truck 2 at the bottom center thereof, which composes a linear pulse motor, together with the aforementioned stators 1.

Numeral 25 denotes guide rollers for preventing rolling of the conveying truck while rolling on both inside surfaces of the aforementioned tracks 31. These guide rollers 25 are located at the bottom of the conveying truck 2.

The magnetic flux produced by the aforementioned stator 1 is directed at nearly a right angle to the forwarding direction of the conveying truck 2.

As shown in this diagram, the stator 1 is placed nearly at the center of the base 3 or just in the intermediate position between the two tracks 31.

Conveying systems utilizing the linear pulse motors of such a construction have the following disadvantages:

1 Since the stator 1 is located at the central part between the tracks 31 and the mover 21 is placed at the central part of the conveying truck 2 in correspondence thereto, the bottom part of said conveying truck 2 is closed, leaving no room for providing any openings.

This makes it impossible to subject the work carried on the conveying truck 2 to any operation performed from below, resulting in inconvenience in assembling work, etc., of vehicles or home electric appliances.

2 With the mover 21 located at the center of the conveying truck 2, the electromagnetic attraction between the stator and the mover 21 can not be ignored.

Besides, on account of the fixed position of the mover 21 and its weight, the bending moment at the central part of the conveying truck 2 becomes very large. Consequently, due to the aforementioned two causes, the conveying truck 2 as a whole is deformed in a bow shape, making it difficult to hold the clearance between the mover 21 and the stator 1 at a specified value. As a result, the operation of the linear pulse motor becomes unstable, causing various ill effects on the conveying state.

3 Besides, with the mover 21 integrally composed with the conveying truck 2, the conveying truck 2 as a whole has a large weight, resulting in a disadvantage of large power requirement.

SUMMARY OF THE INVENTION

The present invention has as its object providing a conveying system utilizing a linear pulse motor, which permits operation to be performed from below on the work loaded on a conveying truck.

The present invention also has as its object providing a conveying system utilizing a linear pulse motor and having a conveying truck which has a small dead weight.

The present invention provides a conveying system utilizing a linear pulse motor, being a conveying system equipped with a conveying truck having a mover of the linear pulse motor fixed at the side bottom thereof and main travelling rails on which stators are mounted, in which openings for use in operation on the work having specified areas are provided nearly at the central part of the aforementioned conveying truck, the stators of the aforementioned linear pulse motor being located at the stations for the conveying truck, and the aforementioned mover and stators composing the linear pulse motor.

BRIEF DESCRIPTION OF THE DRAWINGS

FIG. 3 is a side view of the bottom part of a conveying system of this invention; and FIG. 4 is a front view, as seen from the forwarding direction of the conveying truck from which the driver cover is taken off.

DESCRIPTION OF THE PREFERRED EMBODIMENTS

Figure 1:
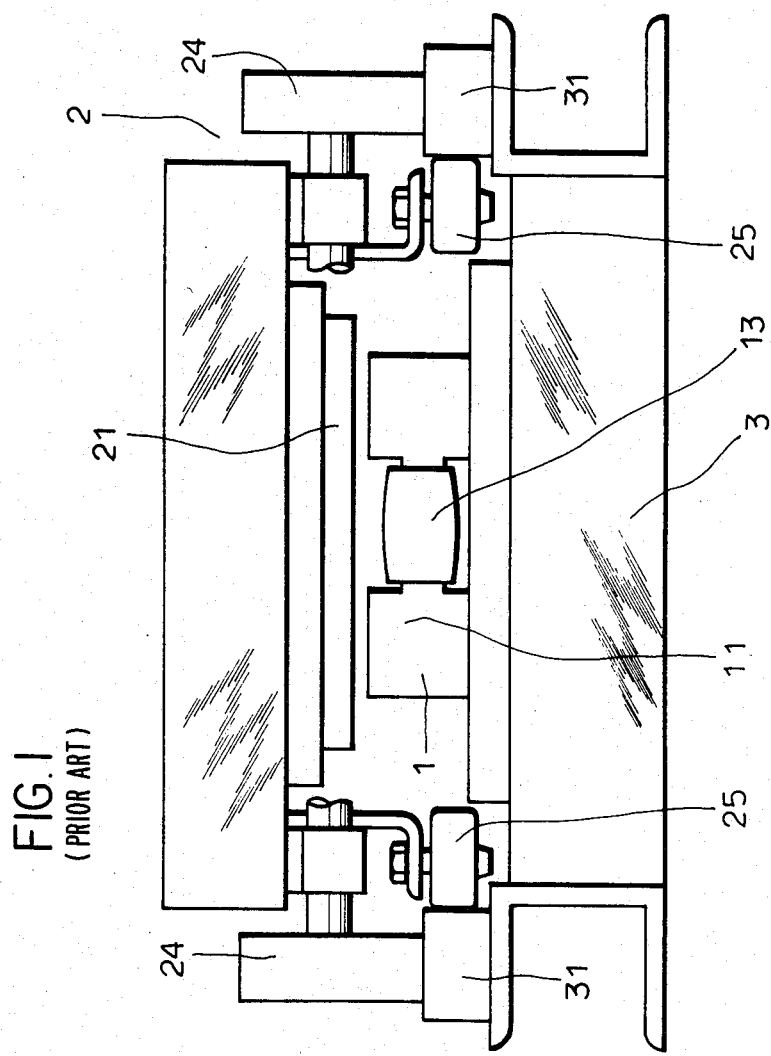
FIG. 1 is a diagram for explanation of the main part of the conveying system utilizing a hitherto used linear pulse motor.
Figure 2:
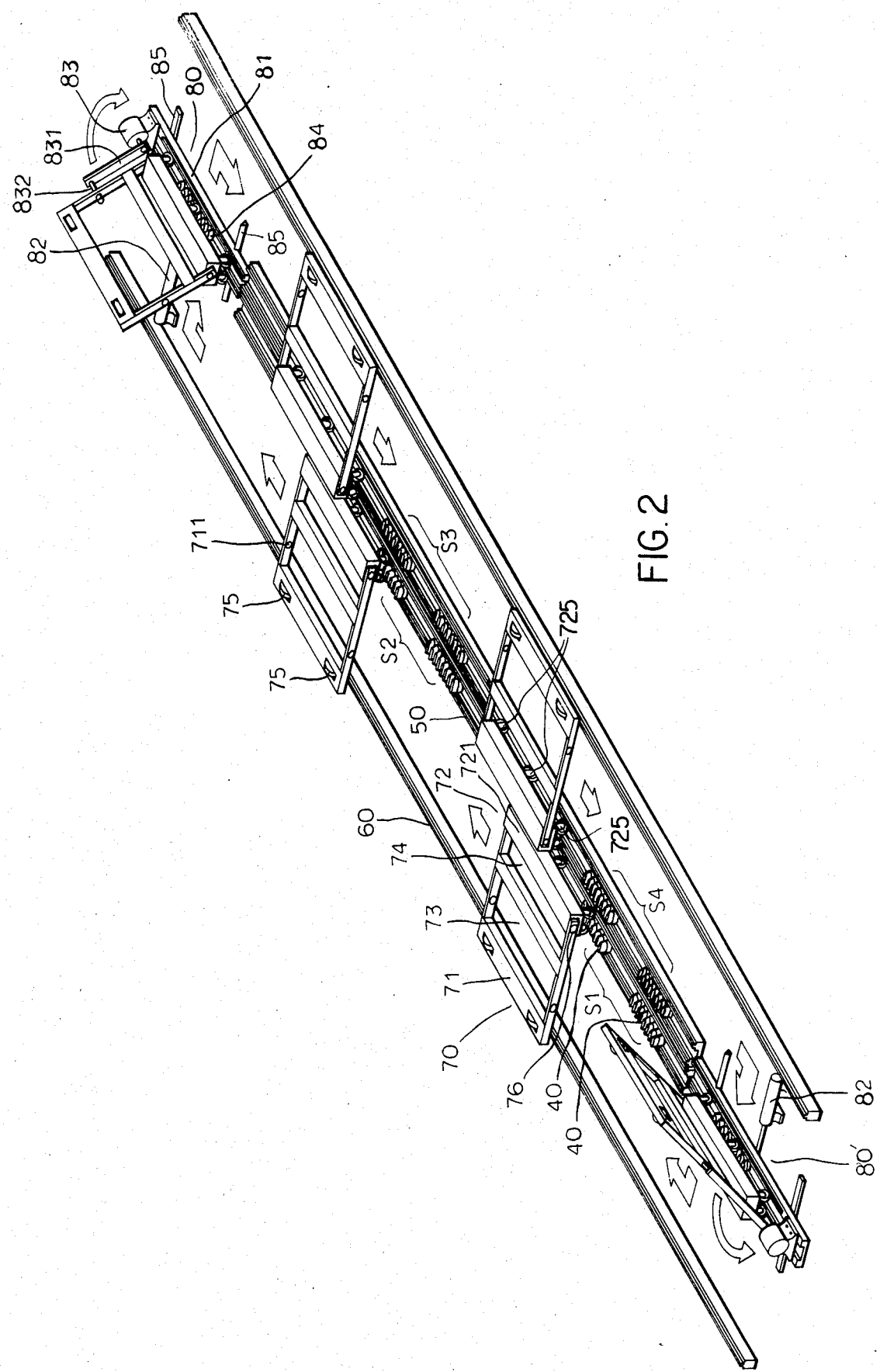
FIG. 2 is a total perspective view of a conveying system utilizing the linear pulse motor of this invention.

FIG. 2 is a total perspective view of a conveying system utilizing a linear pulse motor of this invention.

According to this figure, the tracks containing main travelling rails and auxiliary rails are provided in two adjacent sets to compose a reciprocal truck line as a whole, for reciprocally moving the conveying truck in the directions indicated by → and ←.

However, showing the aforementioned tracks as a reciprocal truck line is not essential for this invention.

In this drawing, 40 designates stators formed of magnetic bodies such as pure iron, etc., the stators being fixedly installed in pairs between two pairs of parallel travelling rails 50, each pair of rails being formed with a concave therebetween, forming stations S1, S2, S3 and S4.

Auxiliary travelling rails 60 are installed at a distance, equal to the width of the travelling truck from the aforementioned main travelling rails 50.

Numeral 70 stands for a travelling truck; the mover is located at the side bottom of the travelling truck. Thus the travelling truck 70 includes a driver 72 coupled to the aforementioned chassis 71 through a hinge or pivot 76 and the driver 72 includes the mover 723. The chassis 71 has openings with specified areas and is provided with a plurality of main wheels 725 which roll on the aforementioned main travelling rails 50 and auxiliary travelling rails 60 for auxiliary wheels 75 mounted on the other side of the chassis from the mover 723.

In this system, the mover 723 made of a magnetic body such as pure iron, etc., provided in the aforementioned driver 72 and the aforementioned stators 40 compose a linear pulse motor.

FIG. 3 is a side view of the bottom part of the conveying truck for showing the part of the linear pulse motor in the conveying system of this invention and FIG. 4 is a front view of the conveying truck with its driver cover 721 taken off, as seen from its front.

The stator 40 fixed on the main travelling rail 50 includes cores 41 formed in a comb shape at definite pitches and coils 42 placed around respective comb teeth of the aforementioned cores 41, with a plurality of undulations 411 formed at the tip of each of the aforementioned comb teeth.

The winding of the aforementioned coil 42 is so wound on the coil that the magnetic flux will be produced in each comb tooth vertically.

On the other hand, the driver 72 provided at the bottom of the travelling truck 70 includes driver cover 721 and frame 722, mover 723 fixed on the frame 722 on the lower surface thereof, and wheel carriers 724 and wheels 725.

The aforementioned mover 723 is composed in a comb shape formed with a pitch a little different from the pitch of the cores 41.

In the following, the operation of the conveying truck is described;

1 The conveying truck 70 is initially at rest at the station S1.

2 The aforementioned conveying truck 70 receives an instruction from a separately installed computer to go to the station S2, to stop there.

3 The instruction from the aforementioned computer is entered into a separately installed controller; then, based on the signal from the controller, the stators 40 at the station S1 are excited, causing the aforementioned conveying truck 70 to go ahead in the direction of →.

4 As the conveying truck 70 arrives at the station S2, stators there are excited to stop the conveying truck 70, based on the stop instruction from the computer, causing the aforementioned conveying truck 70 to stop.

It should be noted that conversely to the embodiment of this invention, the stators 40 may be mounted on the driver 72 of the conveying truck 70, and the mover 723 on the main travelling rails.

As an alternative embodiment to this invention, rubber rollers may be substituted for the wheels 75 held by the chassis 71, so that they roll directly on the floor, while sparing the auxiliary travelling rails 60.

The conveying system of this invention is a conveying system equipped with a travelling truck having the mover of the linear pulse motor fixed at the side bottom thereof. The stators of the linear pulse motor, and the main travelling rails on which the aforementioned stators are mounted, are arranged at the side of the truck. Openings for use in operation having specified opening areas are provided about the central part of the aforementioned conveying truck, the stators of the aforementioned linear pulse motor being provided on the stations for the conveying truck, and the aforementioned mover and stators composing the linear pulse motor.

This system permits any operation to be performed from below on the work carried on the conveying truck; and further, this invention has realized a conveying system utilizing a linear pulse motor and equipped with a conveying truck which has a small dead weight.

What is claimed is:

1. A conveying system comprising:
   a linear pulse motor comprising stators and a mover;
   a travelling conveying truck comprising a driver and a chassis, said driver being positioned at a side of said chassis and including said mover of said linear pulse motor;
   a plurality of main wheels mounted on said truck and arranged in pairs at each side of said driver;
   a pair of parallel main travelling rails spaced to accommodate a respective one of each of said pairs of main wheels;
   a plurality of said stators of said linear pulse motor positioned between said pair of main travelling rails to cooperate with said mover to compose said linear motor for driving said truck;
   a plurality of auxiliary wheels mounted on said chassis at a side opposite to the side of said driver for supporting said opposite side; and
   a pivotal hinge means coupling said chassis to said driver so that said chassis may be pivoted to provide for reciprocal movement of said truck on an adjacent set of rails.

2. A conveying system as recited in claim 1, wherein said chassis has openings with specified areas in the central portion thereof to provide access to the bottom of work loaded on said conveying truck.

3. A conveying system as recited in claim 1, further including an auxiliary rail installed at a distance from said main rails, said distance being substantially equal to the width of said travelling truck, to accomodate said auxiliary wheels.

4. A conveying system as recited in claim 1, wherein said stators comprise the winding parts of said linear pulse motor.

* * * * *